United States Patent
Vadiveloo

(10) Patent No.: US 8,126,747 B2
(45) Date of Patent: *Feb. 28, 2012

(54) METHOD AND SYSTEM FOR EVALUATING INSURANCE LIABILITIES USING STOCHASTIC MODELING AND SAMPLING TECHNIQUES

(75) Inventor: Jeyaraj Vadiveloo, Vernon, CT (US)

(73) Assignee: Watson Wyatt & Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/009,914

(22) Filed: Jan. 20, 2011

(65) Prior Publication Data
US 2011/0106572 A1    May 5, 2011

Related U.S. Application Data

(63) Continuation of application No. 12/565,080, filed on Sep. 23, 2009.

(51) Int. Cl.
*G06Q 40/00* (2012.01)
(52) U.S. Cl. .............................................. 705/4; 705/35
(58) Field of Classification Search ............ 705/4, 35–40
See application file for complete search history.

(56) References Cited

U.S. PATENT DOCUMENTS
6,085,175 A    7/2000   Gugel et al.
(Continued)

FOREIGN PATENT DOCUMENTS
JP    2005-352742    12/2005
(Continued)

OTHER PUBLICATIONS

Mulvey et al. "Risk Management of a P/C Insurance Company Scenario Generation, Simulation and Optimization," *Proceedings of the 2003 Winter Simulation Conference* pp. 364-371.

(Continued)

*Primary Examiner* — Olabode Akintola
(74) *Attorney, Agent, or Firm* — Finnegan, Henderson, Farabow, Garrett & Dunner, L.L.P.

(57) ABSTRACT

In computer-implemented methods and systems for estimating financial modeling outcomes, financial data segmented into a number (x) of classes and scenario data for a set of model scenarios are processed to obtain an estimated model outcome distribution. The class segments are mutually exclusive and collectively exhaustive of the financial data. Multiple model tests are performed with samples of the financial data until a cumulative model outcome distribution is within a pre-determined acceptable tolerance limit from a distribution of fully assessed model outcomes obtainable by performing a single test of the scenarios using all of the financial data. The number (x) of classes, the sample size (z), and a number (y) of times that the tests are performed ensure that the cumulative model outcome distribution is within the pre-determined acceptable tolerance limit from the distribution of fully assessed model outcomes.

20 Claims, 11 Drawing Sheets

U.S. PATENT DOCUMENTS

| | | | |
|---|---|---|---|
| 7,028,005 | B2 | 4/2006 | Messmer et al. |
| 7,039,608 | B2 | 5/2006 | Johnson et al. |
| 7,072,841 | B1 * | 7/2006 | Pednault .................. 705/4 |
| 7,165,043 | B2 | 1/2007 | Keyes et al. |
| 7,197,427 | B2 | 3/2007 | Noonan et al. |
| 7,225,113 | B2 | 5/2007 | Rothschild |
| 7,246,035 | B1 | 7/2007 | Palit |
| 7,315,842 | B1 | 1/2008 | Wang |
| 7,383,239 | B2 | 6/2008 | Bonissone et al. |
| 7,392,201 | B1 | 6/2008 | Binns et al. |
| 7,562,058 | B2 | 7/2009 | Pinto et al. |
| 7,567,914 | B2 * | 7/2009 | Bonissone et al. .......... 705/4 |
| 7,610,257 | B1 | 10/2009 | Abrahams |
| 7,774,257 | B2 | 8/2010 | Maggioncalda et al. |
| 7,778,897 | B1 | 8/2010 | Rachev et al. |
| 7,813,944 | B1 | 10/2010 | Luk et al. |
| 2002/0184133 | A1 | 12/2002 | Zangari et al. |
| 2003/0208428 | A1 | 11/2003 | Raynes et al. |
| 2004/0030667 | A1 * | 2/2004 | Xu et al. .................. 707/1 |
| 2004/0103013 | A1 | 5/2004 | Jameson |
| 2004/0117051 | A1 | 6/2004 | Ford |
| 2004/0181378 | A1 | 9/2004 | Gilmore |
| 2004/0220838 | A1 | 11/2004 | Bonissone et al. |
| 2004/0236611 | A1 | 11/2004 | Bonissone et al. |
| 2005/0278248 | A1 | 12/2005 | Sakimura et al. |
| 2006/0242217 | A1 | 10/2006 | Bartels |
| 2007/0016542 | A1 | 1/2007 | Rosauer et al. |
| 2007/0027698 | A1 | 2/2007 | Daul et al. |
| 2007/0043656 | A1 | 2/2007 | Lancaster |
| 2008/0082371 | A1 | 4/2008 | Phillips |
| 2008/0183506 | A1 | 7/2008 | Mamorsky |
| 2008/0249925 | A1 | 10/2008 | Nazari et al. |
| 2009/0048876 | A1 | 2/2009 | Bonissone et al. |
| 2009/0265190 | A1 * | 10/2009 | Ashley et al. .................. 705/4 |
| 2010/0036684 | A1 | 2/2010 | McNamee et al. |
| 2010/0204967 | A1 | 8/2010 | Mun |

FOREIGN PATENT DOCUMENTS

| | | |
|---|---|---|
| WO | WO 03/065275 | 8/2003 |
| WO | WO 2006/105170 A2 | 5/2006 |

OTHER PUBLICATIONS

Richaudeau "Automobile Insurance Contracts and Risk of Accident: An Empirical Test Using French Individual Data," *The Geneva Papers on Risk and Insurance Theory* 24:97-114 (1999).

Wicklund et al. "Topic: Expert System Implementations for Business Applications," *ACM* pp. 129-139 (1987).

Ramp: Rules Abstraction for Modeling and Prediction (1995) by Chidanand Apte, C. Apte, S. J. Hong, Jorge Lepre, and Barry Rosen, S. Prasad, B. Rosen, Se June Hong, Jorge Lepre, Seema Prasad, Barry Rosen, IBM Research Division Technical Report RC-20271, IBM T.J. Watson Research Center, Jan. 12, 1996, pp. 1-14.

Scenario Generation And Stochastic Programming Models For Asset Liability Management, Roy Kouwenberg, Available online Aug. 2, 2001. Econometric Institute, Erasmus University Rotterdam, P.O. Box 1738, 3000 DR Rotterdam, The Netherlands.

A Comparative Anatomy Of Credit Risk Models, Michael B. Gordy, Board of Governors of the Federal Reserve System, Division of Research and Statistics, Washington, DC 20551, USA. Available online Dec. 15, 1999.

* cited by examiner

|  | S1: | S2: | S3: | S4: |
|---|---|---|---|---|
| SAM1b → | ☐ r1 | ☐ r5 | ☐ r13 | ☐ r25 |
| SAM2b → | ☐ r2 | ☐ r6 | ☐ r14 | ☐ r26 |
| SAM3b → | ☐ r3 | ☐ r7 | ☐ r15 | ☐ r27 |
| SAM4b → | ☐ r4 | ☐ r8 | ☐ r16 | ☐ r28 |
| Unsampled Records → | | ☐ r9<br>☐ r10<br>☐ r11<br>☐ r12 | ☐ r17<br>☐ r18<br>☐ r19<br>☐ r20<br>☐ r21<br>☐ r22<br>☐ r23<br>☐ r24 | ☐ r29<br>☐ r30<br>☐ r31<br>☐ r32 |

|         | S1: | S2:       | S3:                | S4:        |
|---------|-----|-----------|--------------------|------------|
| SAM1c → | r1  | r5<br>r6  | r13<br>r14<br>r15  | r25<br>r26 |
| SAM2c → | r2  | r7<br>r8  | r16<br>r17<br>r18  | r27<br>r28 |
| SAM3c → | r3  | r9<br>r10 | r19<br>r20<br>r21  | r29<br>r30 |
| SAM4c → | r4  | r11<br>r12| r22<br>r23<br>r24  | r31<br>r32 |

| | S1: | S2: | S3: | S4: |
|---|---|---|---|---|
| SAM1d → | ☐ r1 | ☐ r5 | ☐ r13 | ☐ r25 |
| SAM2d → | ☐ r2 | ☐ r5 | ☐ r14 | ☐ r26 |
| SAM3d → | ☐ r3 | ☐ r5 | ☐ r15 | ☐ r27 |
| SAM4d → | ☐ r4 | ☐ r5 | ☐ r16 | ☐ r28 |
| Unsampled Records → | | ☐ r6<br>☐ r7<br>☐ r8<br>☐ r9<br>☐ r10<br>☐ r11<br>☐ r12 | ☐ r17<br>☐ r18<br>☐ r19<br>☐ r20<br>☐ r21<br>☐ r22<br>☐ r23<br>☐ r24 | ☐ r29<br>☐ r30<br>☐ r31<br>☐ r32 |

|  | S1: | S2: | S3: | S4: |
|---|---|---|---|---|
| SAM1e → | ☐ r1 | ☐ r5<br>☐ r6 | ☐ r13<br>☐ r14<br>☐ r15 | ☐ r25<br>☐ r26 |
| SAM2e → | ☐ r2 | ☐ r6<br>☐ r8 | ☐ r16<br>☐ r17<br>☐ r18 | ☐ r27<br>☐ r28 |
| SAM3e → | ☐ r3 | ☐ r7<br>☐ r10 | ☐ r19<br>☐ r20<br>☐ r21 | ☐ r29<br>☐ r30 |
| SAM4e → | ☐ r4 | ☐ r11<br>☐ r12 | ☐ r22<br>☐ r23<br>☐ r13 | ☐ r31<br>☐ r32 |
| Unsampled Records → |  | ☐ r9 | ☐ r24 |  |

METHOD AND SYSTEM FOR EVALUATING INSURANCE LIABILITIES USING STOCHASTIC MODELING AND SAMPLING TECHNIQUES

CROSS REFERENCE TO RELATED APPLICATIONS

This is a continuation of U.S. patent application Ser. No. 12/565,080, filed Sep. 23, 2009, which is incorporated herein by reference in its entirety.

TECHNICAL FIELD

The present disclosure relates to the field of data analysis, particularly to statistical analysis of, for example, financial data or data from other large populations of entities or items concerning which statistical inferences are to be drawn and from which predictive or probabilistic outcomes are to be derived, and more particularly to actuarial analysis of insurance liabilities.

BACKGROUND

Insurance may be defined as the equitable transfer of the risk of a loss, from one entity to another, in exchange for a premium. It may additionally be thought of as a guaranteed and known small loss to prevent or mitigate a large, possibly devastating loss. Insurance companies offer and individuals purchase insurance contracts based on their understanding of the consequences of certain events and the likelihood that the events will occur. For example, it is rare for homes to be consumed by fire, but it is common to obtain home insurance to cover the catastrophic risk that a home will be destroyed by fire. The more likely the risk, the more expensive the home insurance will be. In addition, the less expensive the house, the less expensive the home insurance will be.

Statistics is a mathematical science pertaining to the collection, analysis, interpretation or explanation, and presentation of data. Statistics also provides tools for prediction and forecasting using data and statistical models. Models are developed to explain behavior or to make predictive forecasts for a group of individuals or items (also known as a population). A model of a system may be defined by a set of variables. For example, when a financial institution creates a new mortgage offering, it may create a model of the market in which the product is expected to be offered to project demand for the mortgage offering. Model variables may include features of the potential customer base (such as income or demographics), competition, expected customer behavior (such as prepayment assumptions), interest rates, and market behavior. The model may produce an outcome comprising an objective projection (such as an expected annual earning from the product) or a subjective projection (such as the likelihood of obtaining a pre-selected annual earning of the product). Stochastic models (or models that test a system with different fact patterns known as scenarios or "what-if" scenarios) produce sets of outcomes, with each outcome based on a different scenario. Stochastic modeling outcomes may comprise a set of likelihoods of an event, with each likelihood corresponding to a scenario. Scenarios constructed to model demand for the mortgage offering may differ in the features of the offering, such as types of prepayment options or amounts of interest rates. Scenarios may also differ in prepayment assumption or interest rate market conditions in which the product is to be offered, such as an inflationary or recessionary economy or the number of, or similarity of competing products. Examples of scenario parameter values include default assumptions on mortgage payments, and expected returns and volatility parameters for the underlying distribution of market performance. Scenarios may be constructed with a mix of some or all of the variables that make up the model.

Thus, stochastic modeling (or modeling of scenarios, some more probable than others) is performed using data from the population to explain system changes due to the differences between scenarios. Each scenario may be defined at least in part by the set of model variables, and scenario data for each of the scenarios may comprise at least some parameter values for the set of variables such that, when data for a scenario are inputted into the model, the model may produce a different model outcome.

Examples of stochastic processes that may be modeled include stock market and exchange rate fluctuations; signals such as speech, audio and video; medical data such as a patient's EKG, EEG, blood pressure or temperature; and random movement such as Brownian motion or random walks.

In the context of insurance, the group under analysis may be the population of insurance policyholders models, and models may be developed to quantify risk or exposure for certain liabilities for the population of insurance policyholders or to estimate requirements of an insurance company for the levels of capital and asset reserves that will be required to support a series of insurance policies being modeled. Variables for such insurance related models may include mortality assumptions, lapse behavior (such as the rate at which insurance policies are expected to lapse), as well as investment assumptions like interest rate and market behavior. The model outcomes may comprise measures of a risk comprising a likelihood of an occurrence of the insurance liability for a scenario. Variables in a scenario in the insurance context include mortality assumptions, an insurance policy lapse rate, and a rate of market return for investment oriented insurance products. Examples of scenario parameter values include a selected mortality rate, a selected lapse rate, and a selected rate of market return, with the selected rates being modified across scenarios to test the effect of rate changes on the model outcome. Stochastic modeling of risk scenarios may be performed to identify changes in the risk or exposure that may occur or the subsequent impact on future cashflows, capital and reserving requirements, given different scenarios.

Typically, commercial actuarial models of insurance liabilities are developed based on the entire population of insurance policyholders, and stochastic modeling of risk scenarios is performed using the entire population. Analyzing risk scenarios with the entire population eliminates sampling error and therefore may provide more exact information than analyzing risk scenarios based on a random sample of contracts. However, modeling with the entire population is computationally complex and time consuming, despite advances in technology, limiting the number of risk scenarios that can be tested and making it hard to adequately assess risk in real time.

Analyzing risk scenarios with only a subset of the entire dataset may reduce computational time for complex financial calculations involving the use of stochastic scenarios. However, modeling with only a subset of the available data may not provide results that are accurate to an acceptable tolerance level.

SUMMARY

Embodiments of a computer-implemented method and system for performing analysis of financial data may comprise the steps of storing, in a computer readable memory, financial data segmented into a number (x) of classes, with the class segments mutually exclusive and collectively exhaustive of the financial data. In one embodiment, the financial data may be segmented into the selected number (x) of classes before storing the financial data in the computer readable memory. Scenario data for a set of scenarios may also be stored in a computer readable memory. Each of the scenarios may be defined at least in part by a set of variables, and the scenario data for each of the scenarios comprise at least some parameter values for the set of variables.

A computer processor associated with the computer readable memory may be provided with a model of a system defined at least in part by the set of variables, and the financial data and the scenario data may be processed with the computer processor using the model to obtain an estimated model outcome distribution comprising a distribution of estimated model outcomes relating to the system and based on the set of scenarios. In one embodiment, the financial data may comprise policy data for a population of insurance policies, and the model may comprise a model of insurance liability. The model outcomes may then comprise measures of a risk comprising a likelihood of an occurrence of the insurance liability for a scenario in the set of scenarios. In one embodiment, each of the estimated model outcomes may comprise a value and may be adjusted relative to the population so that a value of a selected estimated model outcome associated with a selected scenario comprises a preliminary estimate of a value of a fully assessed model outcome associated with the selected scenario and obtainable by performing, with the model, the single simulation of the scenario using the entire population of records.

The processing may further comprise selecting a first subset of the financial data as a first sample of the financial data. The first subset may be drawn without replacement from each of the class segments and may have a sample size (z). In one embodiment, the samples are representative of the classes in the financial data. A first test of the set of scenarios may be performed with the model and the first subset to obtain a first set of sample outcomes for each of the scenarios. The selecting and performing steps may be repeated using additional subsets of the financial data to perform additional tests of the set of scenarios and to obtain additional sets of sample outcomes for each of the scenarios. The additional subsets may be drawn without replacement from each of the class segments. In certain embodiments, the additional subsets may be drawn with replacement from the population but without replacement from each of the class segments after prior samples are returned to the population. In another embodiment, the additional subsets also have the sample size (z).

When the performing step has been repeated to obtain additional sets of sample outcomes for each of the scenarios, the first sample outcomes and the additional sample outcomes are combined to obtain a cumulative model outcome distribution. In one embodiment, the sample outcome distributions may be combined by averaging sample outcomes associated with each of the scenarios for each of the tests to obtain an average estimated model outcome for each of the scenarios.

The selecting and performing steps may be repeated until the cumulative model outcome distribution is within a pre-determined acceptable tolerance limit from a distribution of fully assessed model outcomes for the set of scenarios obtainable by performing, with the model, a single test of the set of scenarios using all of the financial data. The cumulative model outcome distribution is then identified as the estimated model outcome distribution. In one embodiment, the estimated model outcomes may be ordered to obtain percentiles in the estimated model outcomes distribution. The number (x) of classes, the sample size (z), and a number (y) of tests that comprises a count of the number of times that the performing step is conducted ensure that the cumulative model outcome distribution is within the pre-determined acceptable tolerance limit from the distribution of fully assessed model outcomes.

In one embodiment, stratified sampling techniques may be used to generate the samples. In another embodiment, selecting the first sample and the additional samples may comprise selecting, from a selected class segment a number of records that is proportional to a count of records in the selected class segment relative to a total count of records in the financial data.

In another embodiment, in which each of the sample outcomes may comprise a value, combining the sample outcomes may further comprise adjusting each of the sample outcomes relative to the population so that the value of a selected sample outcome associated with a selected scenario comprises a preliminary estimate of the value of a fully assessed model outcome associated with the selected scenario and obtainable by performing, with the model, a single simulation of the scenario using the population of records.

In one embodiment, the financial data may be randomly sampled from each of the class segments to create a pseudo-population of records. The processing of the financial data and the scenario data may further comprise treating the pseudo-population as the population for the selecting step and the performing step to obtain pseudo-population outcomes for each of the scenarios. The combining step may further comprise combining the pseudo-population outcomes to obtain a distribution of cumulative model outcomes for the pseudo-population. In a further aspect of the embodiment, the selecting and performing steps may be repeated using the number (x) of classes, the sample size (z), and the number (y) of tests to estimate the fully assessed model outcomes for the entire population. In a further aspect of the embodiment, each of the pseudo-population outcomes may comprise a value and each of the pseudo-population outcomes may be adjusted relative to the population so that a value of a selected pseudo-population outcome associated with a selected scenario comprises a preliminary estimate of a value of a fully assessed model outcome associated with the selected scenario that would be obtainable by performing, with the model, the single simulation of the scenario using the population of records.

In another embodiment, the number (y) of tests and the sample size (z) may be selected by performing the processing step with a plurality of combinations of the sample size and the number of tests to identify an optimal combination of the sample size and the number of tests at which is obtained an optimal speed of convergence of the cumulative model outcome distribution over repetitions of the selecting and performing steps. The optimal combination may be selected as the number (y) of tests and the sample size (z).

In another embodiment, the number (y) of tests and the sample size (z) may be selected by selecting a plurality of sample sizes and performing the processing step with the plurality of sample sizes to identify a number of tests required to obtain a pre-determined level of convergence of the cumulative model outcome distribution over repetitions of the selecting and performing steps for each of the sample sizes. An optimal combination of sample size and associated number of tests may be identified at which is obtained an optimal speed of the convergence of the cumulative model outcome distribution; and the optimal combination may be selected as the number (y) of tests and the sample size (z). In a further aspect, the pre-determined level of convergence may be considered to be obtained when the cumulative model outcomes are found to be within a pre-determined value distance from corresponding cumulative model outcomes obtained in a selected number of last previous repetitions of the selecting and performing steps.

Another embodiment comprises a computer-implemented method and system for estimating a distribution of fully assessed model outcomes that would be obtainable by performing a single test of a set of scenarios with a model of a financial system defined at least in part by a set of variables. Financial data segmented into a number (x) of classes may be stored in a computer readable memory. The class segments are mutually exclusive and collectively exhaustive of the financial data. Each of the scenarios is defined at least in part by the set of variables, and the scenario data for each of the scenarios comprise at least some parameter values for the set of variables and may also be stored in the computer readable memory.

A computer processor associated with the computer readable memory may be provided with the model, and the financial data and the scenario data may be processed, with the computer processor, using the model to obtain an estimated model outcome distribution comprising a distribution of estimated model outcomes relating to the system and based on the set of scenarios. The processing may further comprise selecting a first subset of the financial data as a first sample of the financial data, the first subset drawn without replacement from each of the class segments and having a sample size (z). A first test of the set of scenarios may be performed with the model and the first subset to obtain a first set of sample outcomes for each of the scenarios. The selecting and performing steps may be repeated using additional subsets of the financial data, drawn without replacement from each of the class segments, to perform additional tests and to obtain additional sets of sample outcomes for each of the scenarios. The first sample outcomes and the additional sample outcomes may be combined to obtain a cumulative model outcome distribution; and the selecting and performing steps may be repeated until the cumulative model outcome distribution reaches a predetermined level of convergence. After the cumulative model outcome distribution reaches the predetermined level of convergence, the cumulative model outcome distribution may then be determined to be an estimate of the distribution of fully assessed model outcomes.

In another embodiment, the cumulative model outcome distribution may be determined to reach the predetermined level of convergence when the cumulative model outcomes are within a pre-determined value distance from corresponding cumulative model outcomes in cumulative model outcome distributions obtained in a selected number of last previous repetitions of the selecting and performing steps. In another embodiment, the additional subsets are drawn with replacement from the population and without replacement from each of the class segments after prior samples are returned to the population.

In another embodiment, the set of scenarios may comprise a baseline set of scenarios, the estimated model outcomes may comprise a baseline estimated model outcomes, and the estimated model outcome distribution may comprise a baseline estimated model outcome distribution. Second scenario data for a second set of scenarios may be stored in the computer readable memory and the processing step may be performed with the financial data and the second scenario data using the model to obtain a second estimated model outcome distribution associated with the second set of scenarios. In one embodiment, the second estimated model outcome distribution may be developed using the same set of samples used to develop the baseline estimated model outcome distribution. The baseline estimated model outcomes may then be compared with the second estimated model outcomes in order to identify differences therebetween. In a further aspect, the comparing step may comprise determining a ratio of percentile values between the second estimated model outcome distribution and the base-line estimated model outcome distribution.

In other embodiments, a computer program product for estimating a distribution of fully assessed model outcomes obtainable by performing a single test of a set of scenarios with a model of a financial system defined at least in part by a set of variables, comprises one of more computer-readable media. The media collectively have instructions that when executed on one or more computers result in at least the methods described herein to be performed.

In other embodiments, a computer system is provided for estimating a distribution of fully assessed model outcomes obtainable by performing a single test of a set of scenarios with a model of a financial system defined at least in part by a set of variables. The system may comprise a computer readable memory for storing financial data related to a population of financial data records and scenario data for the set of scenarios. The financial data are segmented into a number (x) of classes, wherein the class segments are mutually exclusive and collectively exhaustive of the financial data. Each of the scenarios is defined at least in part by the set of variables, and the scenario data for each of the scenarios comprise at least some parameter values for the set of variables.

The system may also comprise a computer processor associated with the computer readable memory provided with the model and for processing the financial data and the scenario data using the model to obtain an estimated model outcome distribution, comprising a distribution of estimated model outcomes relating to the system and based on the set of scenarios. The processor may further comprise a sampler module for selecting a first subset of the financial data as a first sample of the financial data, the first subset drawn without replacement from each of the class segments of the population and having a sample size (z). The processor may further comprise a modeler module for performing, with the model and the first subset, a first test of the set of scenarios to obtain a first set of sample outcomes for each of the scenarios. The processor may further comprise a repetition module linked to the sampler module and the modeler module for repeating the subset selection and the test performance using additional subsets of the financial data to perform additional tests and to obtain additional sets of sample outcomes for each of the scenarios. The additional subsets are drawn without replacement from each of the class segments. The sampler module may be further configured to draw the additional subsets with replacement from the population and without replacement from each of the class segments after prior samples are returned to the population.

The first sample outcomes and the additional sample outcomes may be combined to obtain a cumulative model outcome distribution. The selecting and performing steps may be repeated until the cumulative model outcome distribution reaches a predetermined level of convergence. the system may also comprise an estimated model outcome distribution identifier for identifying the cumulative model outcome distribution as an estimate of the distribution of fully assessed model outcomes after the cumulative model outcome distribution reaches the predetermined level of convergence.

In further embodiments, a computer-implemented method may estimate a distribution of fully assessed stochastic modeling outcomes obtainable by performing a single test of a set of scenarios with a predictive model of a system defined at least in part by a set of variables. The method may comprise the steps of storing, in a computer readable memory, population data related to a population of data records and segmented into a number (x) of classes, wherein the class segments are mutually exclusive and collectively exhaustive of the population data. Scenario data for the set of scenarios may also be stored. Each of the scenarios is defined at least in part by the set of variables, and the scenario data for each of the scenarios comprise at least some parameter values for the set of variables. A computer processor associated with the computer readable memory may be provided with the predictive model. The population data and the scenario data may be processed using the predictive model to obtain an estimated predictive model outcome distribution, comprising a distribution of estimated predictive model outcomes relating to the system and based on the set of scenarios.

A first subset of the population data may be selected as a first sample of the population data, the first subset drawn without replacement from each of the class segments of the population and having a sample size (z). A first test of the set of scenarios may be performed with the predictive model and the first subset, to obtain a first set of sample predictive outcomes for each of the scenarios. The selecting and performing steps may be repeated using additional subsets of the population data to perform additional tests and to obtain additional sets of sample predictive outcomes for each of the scenarios. The additional subsets may be drawn without replacement from each of the class segments. In one embodiment, the additional subsets may be drawn with replacement from the population and without replacement from each of the class segments after prior samples are returned to the population. The first sample predictive outcomes and the additional sample predictive outcomes may be combined to obtain a cumulative predictive model outcome distribution.

The selecting and performing steps may be repeated until the cumulative predictive model outcome distribution reaches a predetermined level of convergence, after which the cumulative predictive model outcome distribution may be identified as an estimate of the distribution of fully assessed predictive model outcomes after the cumulative predictive model outcome distribution reaches the predetermined level of convergence.

One of ordinary skill in the art will appreciate that the methods described herein may be embodied with various components of a computer system. It is understood that both the foregoing general description and the following detailed description are exemplary and explanatory only, and are not restrictive of the invention as claimed.

The accompanying drawings, which are incorporated in and constitute a part of this specification, illustrate several embodiment(s) of the invention and together with the description, serve to explain the principles of the invention.

BRIEF DESCRIPTION OF THE DRAWINGS

FIG. 2b is a representation of a population of records segmented into classes and sampled according to a first sampling method;

FIGS. 2c to 2e are representations of the population of records sampled according to second, third, and fourth sampling methods;

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Figure 1:
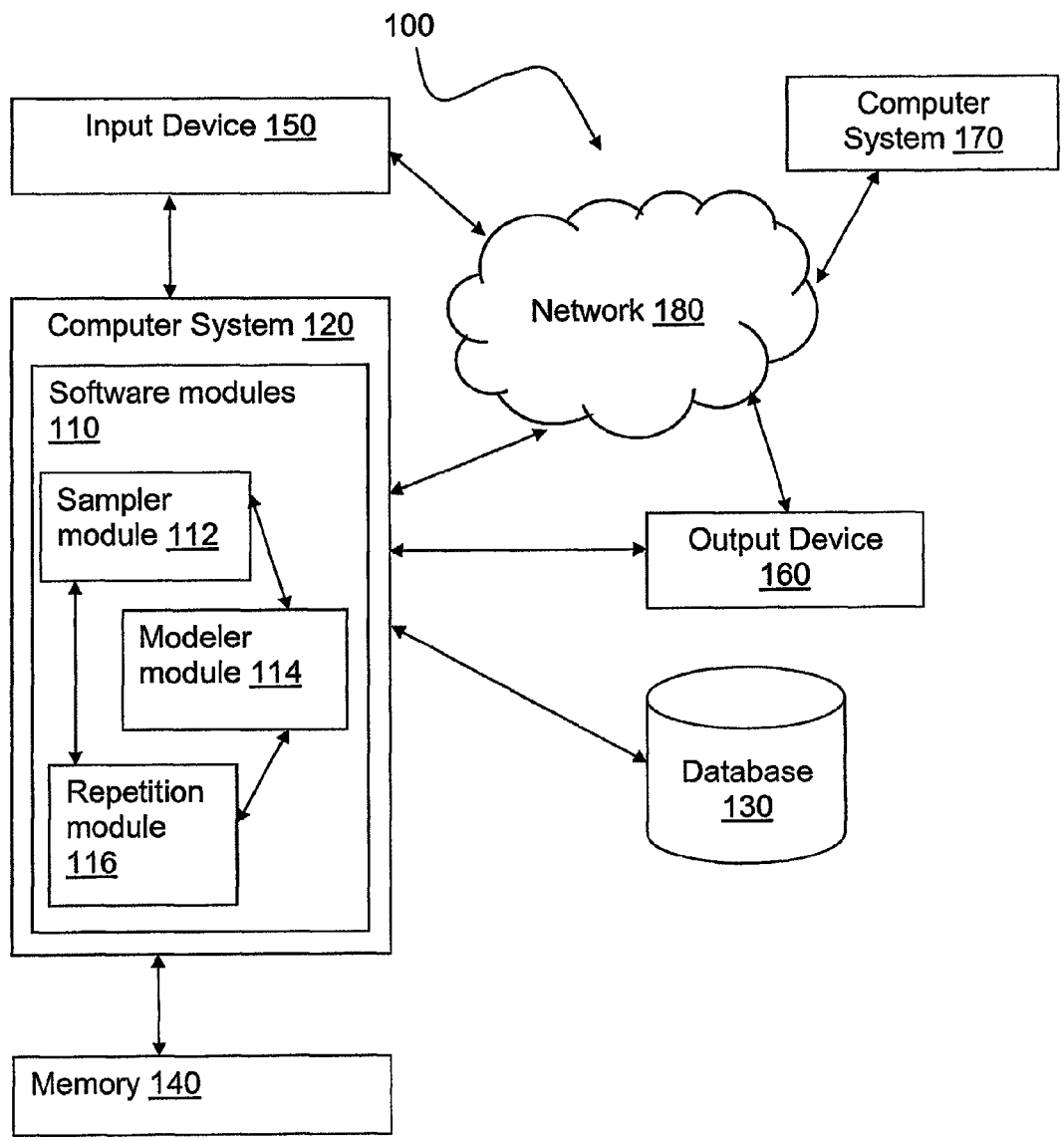
FIG. 1 is a block diagram of an exemplary analysis system.

FIG. 1 shows an exemplary embodiment of a system 100 for stochastic modeling and for estimating predictive or probabilistic modeling outcomes for, for example, financial data or data from other large populations of entities or items concerning which statistical inferences are to be drawn. The system 100 is useful for performing analyses of large datasets and for which sampling error would produce unacceptably inaccurate modeling outcomes or for which real-time modeling results would be unacceptably slow. In particular, the system 100 is useful for analysis of financial data or for actuarial analysis of insurance data. In one embodiment, the analysis may comprise actuarial analysis of insurance liabilities, in which a risk scenario is analyzed with a series of tests of the risk scenario using representative samples of the entire dataset such as the entire dataset of insurance policyholders. The system 100 may include a computer system 120 that processes and acts upon instructions contained in code in software modules 110. The computer system 120 may consist of a single processor, a series of processors within a single computer, a series of computers in mutual communication containing one or more processors, etc. Computer system 120 may be any type of computers or computer systems, which can be implemented in various ways. Computers or computer systems, for example, may comprise one or more processors, memory, an input/output (I/O) devices, nonvolatile storage devices, etc. A computer or computer system may also comprise an internal or external database. The components of a computer or computer system may connect through a local bus interface.

As used herein, the computer system 120 includes or has access to a memory 140 to perform its operations. Memory 140 may contain any type of Random Access Memory (RAM) or Dynamic Random Access Memory (DRAM). In FIG. 1, memory 140 is located external to the computer system 120. In alternative embodiments, memory 140 may be located in the computer system 120 itself.

The system 100 further comprises a database or data storage system 130 containing financial data. In one embodiment, the financial data may be policy data about one or more insurance policies. The data storage system 130 is in communication with the computer system 120. The computer system 120 can retrieve the policy data from the database 130. Database 130 may be implemented as a separate database as shown in FIG. 1 or an internal database stored, for example, on computer system 120. Database 130 may be accessed by other components in system 100, for example, directly via an external connection or via network 180. As used herein, a "data storage system" broadly refers to any data storage devices or memories such as hard disk drives, databases, or enterprise storage systems. A data storage system further includes any processors, programs, and applications accessing and/or managing the data storage devices or memories as well as communication links between the data storage devices or memories, and communication links between the processors, programs, and applications and the data storage devices or memories.

The computer system 120 includes or has access to an input device 150 that enables the computer system to access either information from a user of the system or information created prior to the system's operation.

The computer system 120 includes or has access to an output device 160 for displaying or storing information from the computer system 120. The output device 160 may be a display device such as a computer monitor or screen, a printer, or may produce text messages, email or other electronic output. As shown in FIG. 1, one or more computer systems 170 may be operatively connected to computer system 120, input device and/or output device 160 via a network 180. The input device 150 may operate as a front end operating platform to allow users on one of the computer systems 170 to run "what if" scenarios to test and obtain real time results. Network 180 may be the Internet, an intranet, or any type of wired or wireless communication system. Connections may be implemented through a direct communication link, a local area network (LAN), a wide area network (WAN) and/or other suitable connections. Computer system 170 may be, for example, a special purpose computer or a general purpose computer (e.g. personal computer, network computer, etc.) having one or more processors, memories, and/or nonvolatile storage devices (not shown in FIG. 1). In at least one embodiment, users use a web browser of computer system 170 connected to network 180 to access the software modules 110.

Figure 2A:
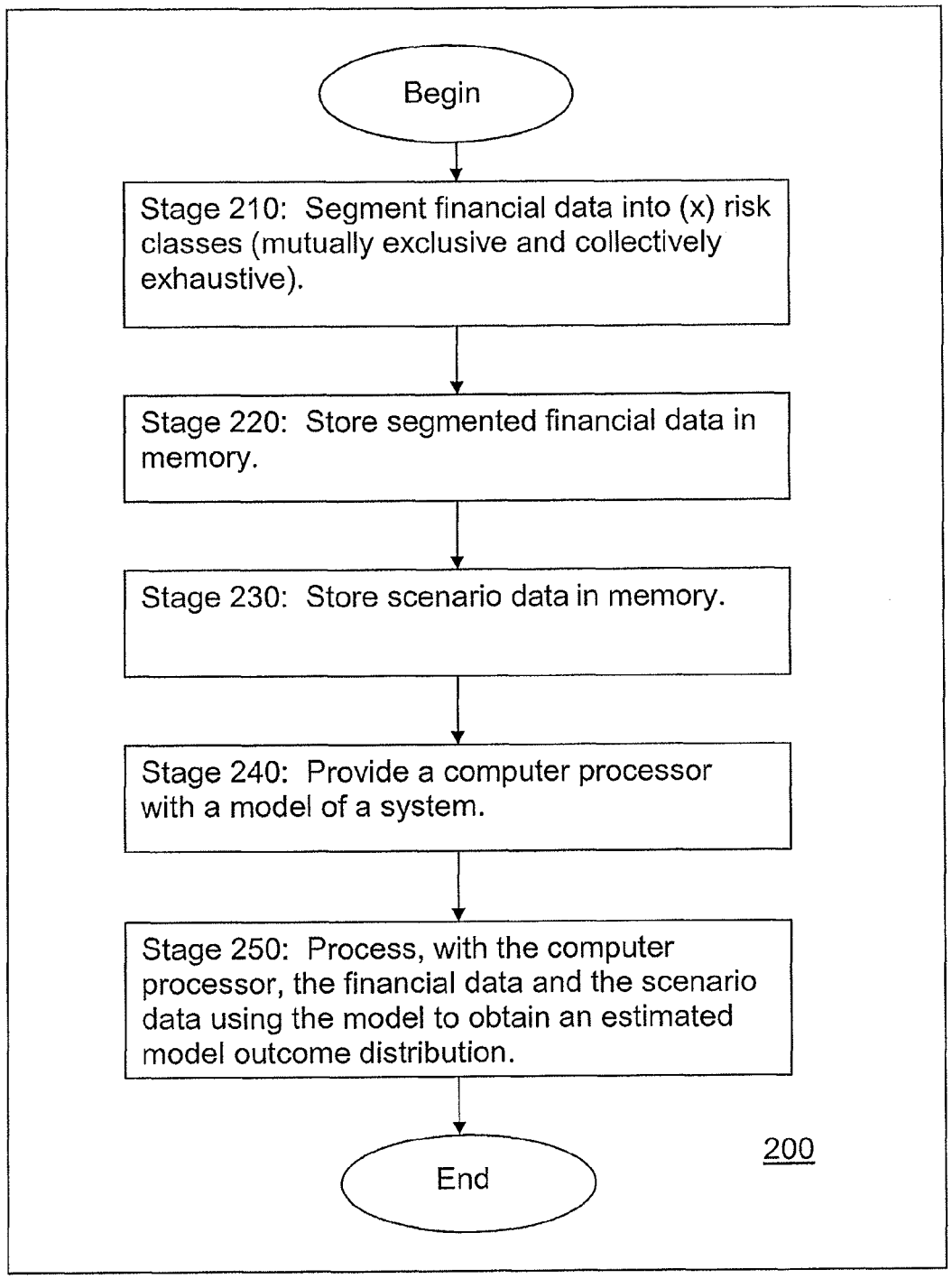
FIG. 2a is a flowchart depicting an exemplary process for estimating financial modeling outcomes.

FIG. 2a illustrates an exemplary method 200 for performing analysis of financial data. In the embodiment described herein, the analysis may comprise actuarial analysis of insurance liabilities, in which a risk scenario is analyzed with a series of tests of the risk scenario using representative samples of records in the entire dataset. However, the methods and systems contemplated herein could be used in analysis of any kind of data in which the population is large and inaccurate test results is not desired. Method 200 may be implemented in software module or modules, such as in one or more of the modules 110 depicted in FIG. 1.

Referring to FIG. 2a, the exemplary method 200 begins at stage 210, in which financial data records for an entire population of records, may be segmented into a number (x) of classes. As shown in FIG. 2b, population 260, having records r1-r32 may be divided into four class segments, S1, S2, S3, and S4, which may be mutually exclusive and collectively exhaustive of the financial data records. Segments S1, S2, S3, and S4 do not necessarily have the same number of records. Each class may be defined by the value of a factor that explains, to a significant extent, variability in the data set. For example, in the embodiment in which the financial data comprise policy data for a population of insurance policyholders, the classes of insurance policies may comprise risk classes that define groups of records all linked by a common trait related to a risk of liability. For example, the risk classes may be defined by variables (e.g. age grouping, gender, marital status, residence, smoker/nonsmoker, type of fund in which an individual has invested, fund size, etc.) that have the greatest impact on the risk measure being calculated. In one embodiment, the classes are defined by associated factors that are significant in identifying the variability in the dataset. For example, Segment S1 may be Male/Non-Smoker records r1-r4, segment S2 may be Female/Non-Smoker records r5-r12, segment S3 may be Male/Smoker records r12-r24, and Segment S4 may be Female/Smoker records r25-r32.

In a further embodiment, the number (x) of classes comprises the minimum number of classes that render the class segments mutually exclusive and collectively exhaustive of the data. In a stage 220, the segmented financial data may be stored in memory 140.

In a stage 230, scenario data for use with a pre-existing model may be stored in memory 140. Scenario data describe a set of scenarios, such as "what-if" scenarios, that may be inputted into a system model and could cause differences in the modeled system. Each scenario may be defined at least in part by the set of model variables, and scenario data for each of the scenarios may comprise at least some parameter values for the set of variables such that, when data for a scenario are inputted into the model, the model may produce a different model outcome. The scenario data may be pre-existing or it may be created by a user of system 100 at computer system 120 or 170 to define a scenario of interest, and it be downloaded from a computer system 120 or 170, may be transferred from database 130, or may be made available in any conventional way from any source.

In a stage 240, a computer processor in computer system 120 may be provided with the pre-existing model. The model may be downloaded from a computer system 170, may be transferred from database 130, or may be made available in any conventional way from any source.

In a stage 250, the computer system 120 may process the financial data and the scenario data using the model to obtain an estimated model outcome distribution. One embodiment of the model processing of stage 250 is described in further detail with reference to FIGS. 3, 2b, and 2c. In a stage 310, a first subset of the financial data may be selected as a first sample of the financial data. The first subset may be drawn without replacement from each of the class segments (in other words, once a record is drawn from a class segment to be included in a sample, it is not eligible for selection to be drawn for the next sample). The first subset may be drawn and may have a sample size (z). In one embodiment, the samples are representative of the classes in the financial data. The sample may be of any size; in one embodiment, such as in FIG. 2b, it may be one record from each class, with sample SAM1b having a sample size 4 and containing records r1, r5, r13, and r25.

In other embodiments, selecting the first sample and the additional samples may comprise selecting, from a selected class segment, a number of records that is proportional to a count of records in the selected class segment relative to a total count of records in the financial data. In FIG. 2c, the samples are representative of the four classes; since segment S1 has only four records and segment S2 has eight records, a sample SAM1c that is representative of the four classes has twice as many records from segment S2 than from segment S1. Hence, sample SAM1c may have a sample size 8 and may contain records r1, r5-6, r13-15, and r25-26.

In the sampling method examples shown in FIGS. 2b and 2c, drawing without replacement exhausts the records in at least one segment in the population 260. In FIG. 2b, while records r9-r12, r17-r24, and r29-r32 are unsampled from segments S2, S3, and S4, respectively, no records are unsampled in segment S1. In a real-life population of records, the dataset would be sufficiently large that sample selection would not exhaust the available records in a sample set, and many records would be unsampled.

The samples shown in FIGS. 2b and 2c have been drawn without replacement, so that a record that is drawn from a class segment for inclusion in a sample is not eligible for selection for the next sample. In other embodiments, samples may be drawn with replacement, so that a record that is drawn from a class segment for inclusion in a sample is returned to the population after sampling and is eligible for selection into the next sample.

The sampling method illustrated in FIG. 2d shows samples having one record for each class and having the records drawn with replacement. In a real-life population of records, the dataset would be sufficiently large that it will be unlikely for a record to be selected for more than one sample. However, for the sake of explanation, samples SAM1d, SAM2d, SAM3d, and SAM4d are shown as each containing record r5 and records r6-r12, r17-r24, and r29-r32 are unsampled.

The sampling method illustrated in FIG. 2e shows another example of samples drawn with replacement. As with the samples shown in FIG. 2c, the number of sample records of a segment type is proportional to the number of records of that segment type in the total population of records. While the samples of FIG. 2e are drawn with replacement from the population, they are drawn without replacement from each of the class segments after prior samples are returned to the population. Samples SAM1e, SAM2e, SAM3e, and SAM4e may share a record (for example, samples SAM1e and SAM2e both contain record r6), but within each sample itself, a record does not appear twice.

In certain embodiments, it may be appropriate to remove, or trim, outlier records (called outliers) in the samples to ensure more representative samples. An outlier is a record that is numerically distant from the rest of the records. It is one that appears to deviate markedly from other members of the sample in which it occurs. As outliers will skew model outcomes, it may be preferable to delete outliers from a sample SAM1b before performing the modeling with the sample.

Outliers may be removed in any conventional manner. In one embodiment, outlier samples are removed from a set of samples to be used in the upcoming analysis by preliminarily selecting a set of samples and creating, for each sample, a sample value comprising, for example, a population estimate. The sample sets may be ranked by their sample values, and a selected number or percentage of the samples having the highest and lowest sample values may be determined to be outlier samples or samples with outlier records, and de-selected from the preliminary set of samples. The deselecting may occur at the time of outlier determination or at any point later in the data processing.

Figure 3:
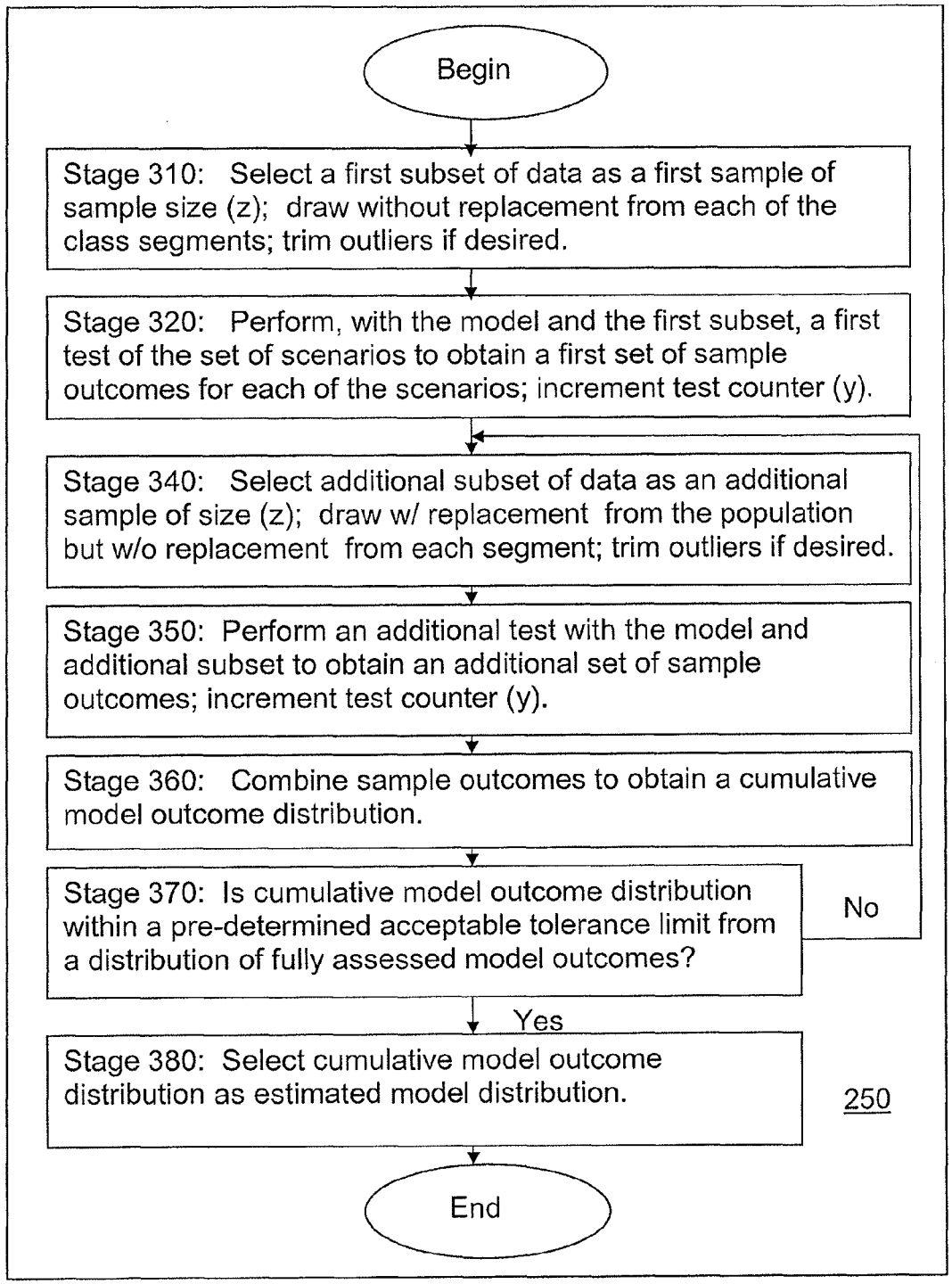
FIG. 3 is a flowchart depicting an exemplary process for developing and testing a cumulative modeling distribution.

In a stage 320, a first test of the set of scenarios stored in memory 140 may be performed with the model and the first sample to obtain a first set of sample outcomes for each of the scenarios. The processor may increment a test counter to "1" to initiate a count of the number (y) of tests performed. As seen in FIG. 3, the selecting and performing steps may be repeated in stages 340 and 350, using additional subsets of the financial data to perform additional tests of the set of scenarios, to obtain additional sets of sample outcomes for each of the scenarios. The additional subsets may also be drawn without replacement from each of the class segments. In one embodiment, the samples are, as shown in FIG. 2e, drawn with replacement from the population of records, but they are also drawn without replacement from each of the class segments after prior samples are returned to the population.

For example, referring again to FIG. 2e, if sample SAM1e is used as the first sample in the performing step of stage 250, sample SAM2e may be used to obtain an additional set of sample outcomes for each of the scenarios. In another embodiment, the additional subsets also have the sample size (z). In further embodiments, stratified sampling techniques may be used to generate the samples.

When the performing step has been repeated to obtain an additional set of sample outcomes for each of the scenarios after replacing the first set of sample outcomes as is shown in FIG. 2e, the first sample outcomes and the additional sample outcomes are combined in a stage 360 to obtain a cumulative model outcome distribution that may be used as an estimate of a distribution of fully assessed model outcomes for the set of scenarios obtainable by performing, with the model, a single test of the set of scenarios using all of the data. In one embodiment, the sample outcome distributions may be combined by averaging sample outcomes associated with each of the scenarios for each of the tests to obtain an average estimated model outcome for each of the scenarios. In another embodiment, the estimated model outcomes may be ordered to obtain percentiles in the estimated model outcomes distribution.

In another embodiment, in which each of the sample outcomes comprise a value, each of the sample outcomes are adjusted relative to the entire dataset so that the value of a selected sample outcome for a scenario is a preliminary estimate of the value of a fully assessed model outcome associated with the same scenario that would be obtained by performing, with the model, a single simulation of the scenario using the entire dataset. Adjusting the sample outcome relative to the entire dataset (which may be known as "true-ing up" the sample results) is advantageous when the sample outcome is an aggregate outcome, for example, when the desired outcome is an estimate of a risk measure, projected cash flow, or another aggregate statistic of interest, for the population of data as a whole. The sample outcome would be an aggregate value for records of the sample, and not for the records for the entire population. In order for the sample outcome to be a preliminary estimate of the entire population, the sample outcome is adjusted by a selected factor, for example, when true-ing up sample outcomes for a selected risk class, multiplying the sample outcome value by the ratio of (value of a factor in records in the risk class)/(sum of the value of the factor in records in the risk class in the sample).

As an example in insurance liability risk analysis, a relevant factor may be a total fund value factor. Referring to FIG. 2c, when total funds from records in the risk class S2 equals $100,000, and the sum of funds for the records in sample SAM1c from risk class S2 equals $10,000, the ratio (total fund value in the risk class)/(sum of fund value in sample records from risk class) equals ($100,000)/($10,000), or 10. Therefore the sample outcome value would be "trued up" by multiplying it by 10 to obtain a preliminary estimate of the value for the entire population. The true-ing up of a sample may occur at any level, for example a sample outcome may be trued-up, or a cumulative model outcome may be trued-up.

The selecting and performing steps may be repeated until a determination at a stage 370 that the estimated model outcome distribution is within a pre-determined acceptable tolerance limit from a distribution of fully assessed model outcomes for the set of scenarios that would be obtained by performing, with the model, a single test of the set of scenarios using all of the financial data. If so, the process of stage 250 may end with a stage 380. The number (x) of classes, the sample size (z), and a number (y) of tests conducted ensure that the estimated model outcome distribution is within the pre-determined acceptable tolerance limit from the distribution of fully assessed model outcomes.

In one embodiment, once the estimated model outcome distribution is found to be within the acceptable tolerance limit from the distribution of fully assessed model outcomes, the repetitions of stages 340-360 (also referred to as replications) are continued until a selected number of replications (such as three replications) have each resulted in the estimated model outcome distribution being within the acceptable tolerance limit from the distribution of fully assessed model outcomes.

Figure 4:
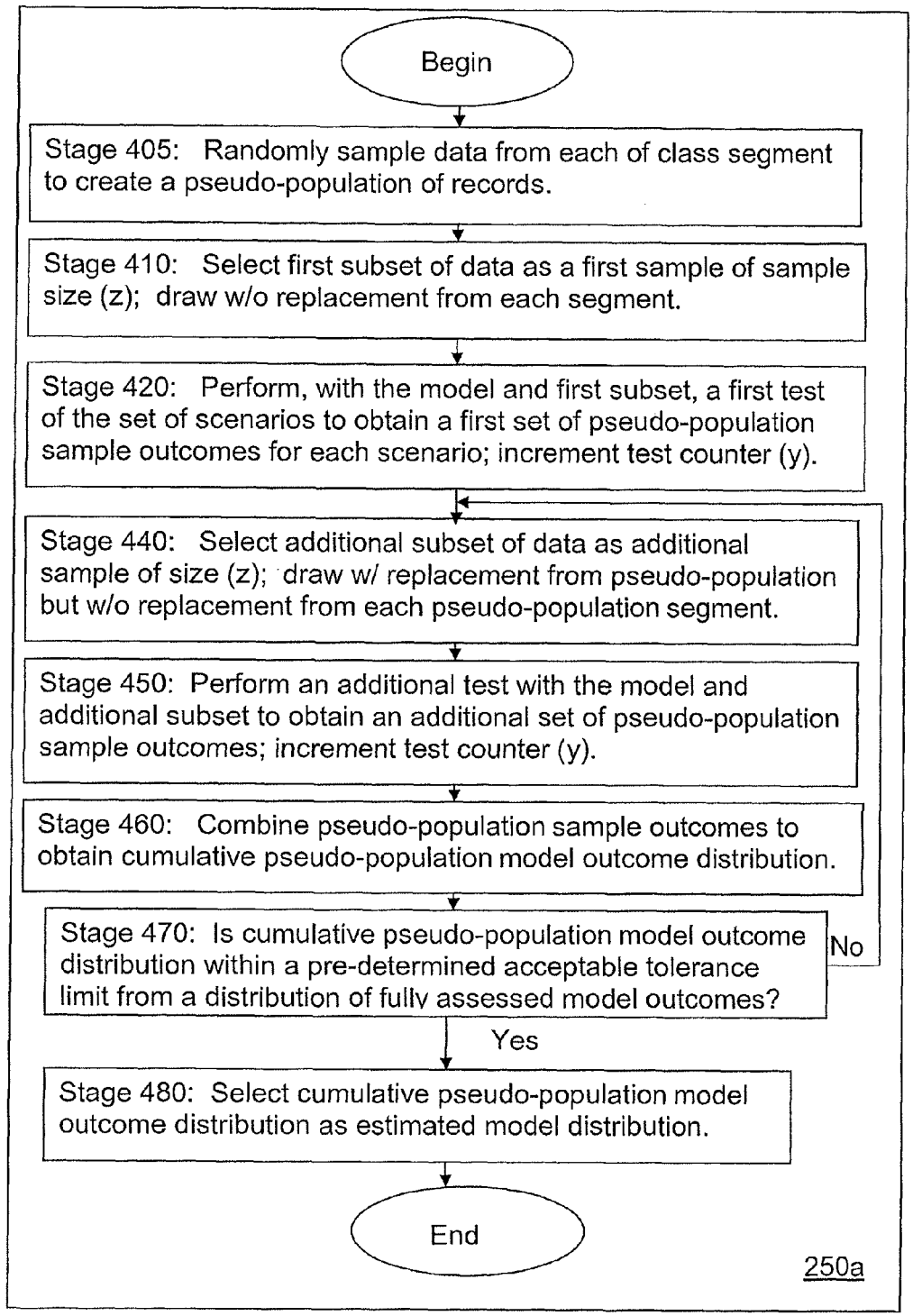
FIG. 4 is a flowchart depicting an alternative exemplary process for developing and testing a cumulative modeling distribution.

FIG. 4 illustrates another embodiment of model processing of method 200. In this alternative embodiment, a subset of the entire population of records of the financial data, which comprises a pseudo-population of the financial data, may be treated as the entire population of data in obtaining the estimated model outcome distribution. At stage 405, financial data may be randomly sampled from each of the class segments to create a pseudo-population of records. The random sampling may be drawn with replacement from the financial data. In other words, once a record is drawn from the population to be included in the pseudo-population is eligible for selection to be drawn for the next sample. The pseudo-population of records are then treated as the population of records in the processing of Stage 250, which are then processed in stages 410, 420, 440, 450, and 460 in order to obtain pseudo-population outcomes for each of the scenarios. The pseudo-population data are processed in stages 410, 420, 440, 450, 460 and 470 analogously to the manner in which the financial data for the entire population are processed in stages 310, 320, 340, 350, 360 and 370 in FIG. 3. The combining step of stage 460 may further comprise combining the pseudo-population outcomes to obtain a distribution of cumulative model outcomes for the pseudo-population. In a further aspect of the embodiment, the selecting and performing steps may be repeated using the number (x) of classes, the sample size (z), and the number (y) of tests to estimate the fully assessed model outcomes for the entire population. When the cumulative model outcome distribution is within a pre-determined acceptable tolerance limit from a distribution of fully assessed model outcomes for the set of scenarios that would be obtained by performing, with the model, a single test of the set of scenarios using all of the financial data (stage 470), the cumulative pseudo-population model outcome distribution is selected as the estimated model distribution, and the process ends (stage 480).

In a further aspect of the embodiment, each of the pseudo-population outcomes may comprise an aggregate value and each of the pseudo-population outcomes may be adjusted relative to the entire dataset so that an aggregate value of a selected pseudo-population outcome associated with a selected scenario comprises a preliminary estimate of an aggregate value of a fully assessed model outcome associated with the selected scenario that would be obtainable by performing, with the model, the single simulation of the scenario using the entire dataset of records.

Figure 5:
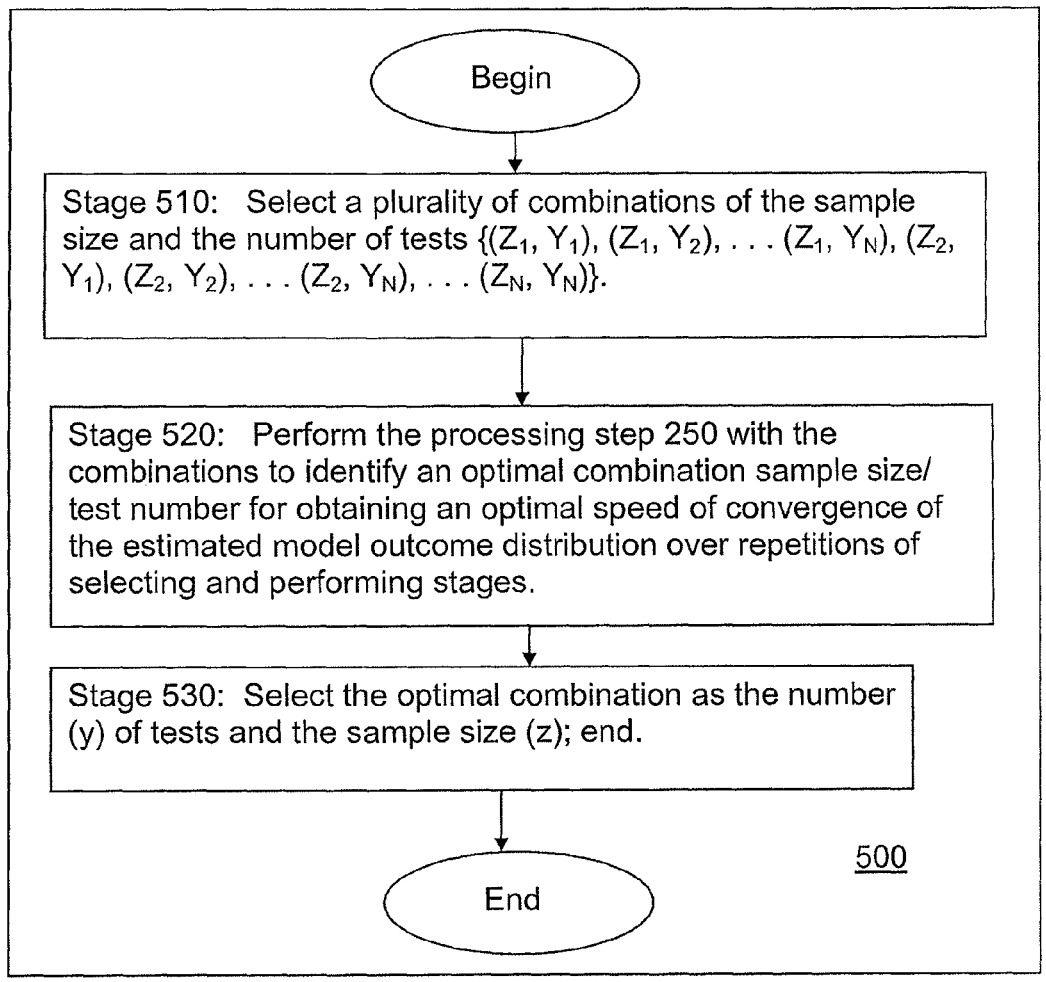
FIG. 5 is a flowchart depicting a method 500 for selecting the number of tests and the sample size for use, for example, in method 200.

Estimated model outcome distribution may converge to the desired level of accuracy depending on the number (x) of classes, the number (y) of tests, and the sample size (z). For example, FIG. 5 illustrates a method 500 for selecting the number (y) of tests and the sample size (z) when the number (x) of classes is held constant. In a stage 510, a plurality of combinations of the sample size and the number of tests $\{(Z_1, Y_1), (Z_1, Y_2), \ldots (Z_1, Y_N), (Z_2, Y_1), (Z_2, Y_2), \ldots (Z_2, Y_N), \ldots (Z_N, Y_N)\}$ are selected. In a stage 520, the processing step 250 may be performed with the combinations of the sample size and the number of tests to obtain an optimal combination of sample size and the number of tests at which is obtained an optimal speed of convergence of the estimated model outcome distribution over repetitions of the selecting and performing steps of stage 250. In one embodiment, the pre-determined level of convergence comprises the estimated model outcomes in the estimated model outcomes distribution being within a pre-determined value distance from estimated model outcomes in estimated model outcome distributions obtained in a selected number of last previous repetitions (such as three repetitions) of the selecting and performing steps.

In a stage 530, the optimal combination may be selected as the number (y) of tests and the sample size (z). In an alternative embodiment of method 500, the number (y) of tests may be held constant to identify an optimal sample size (z), or the sample size (z) may be held constant to identify an optimal number (y) of tests.

Figure 6:
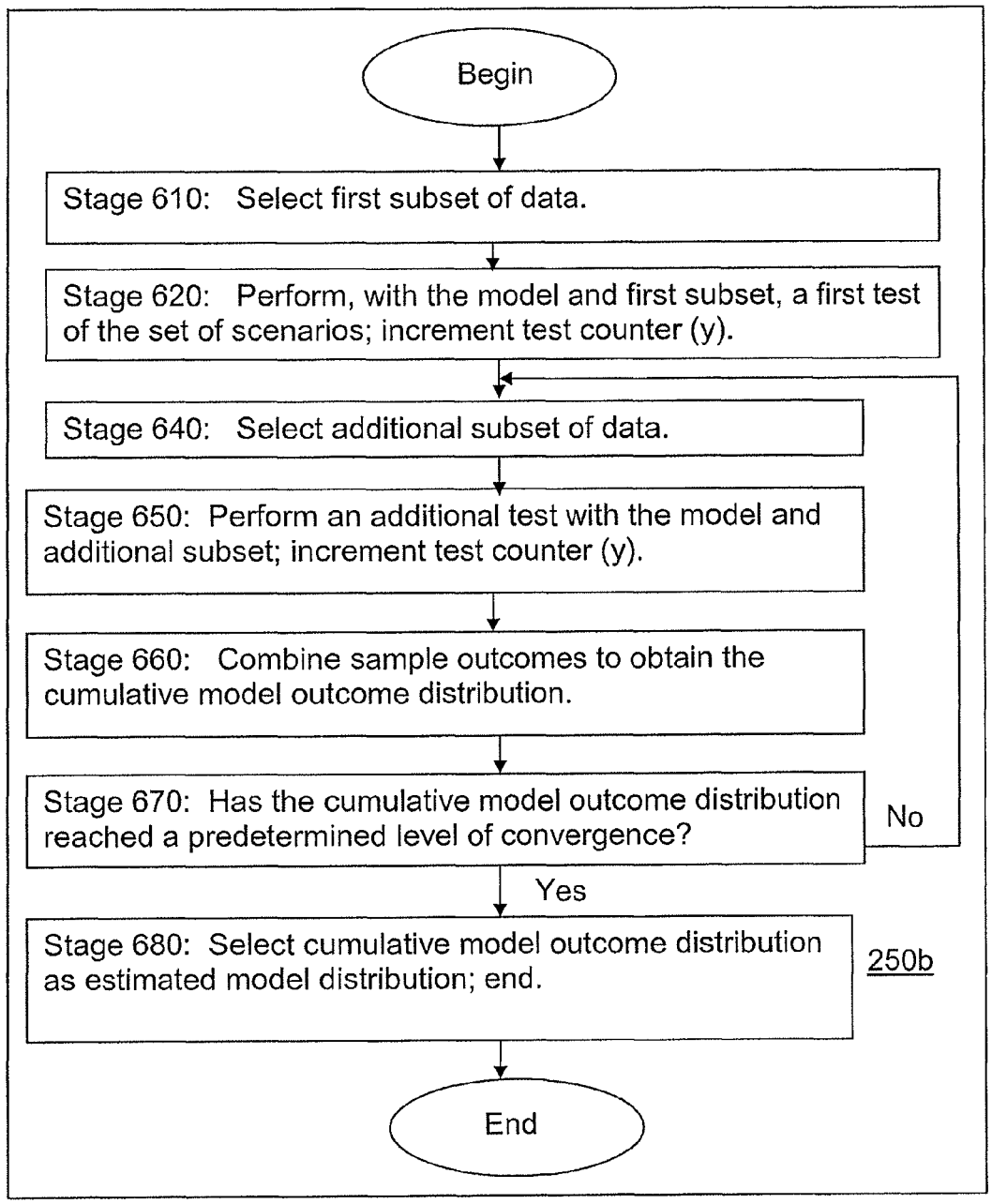
FIG. 6 is a flowchart depicting another embodiment of modeling.

FIG. 6 illustrates another embodiment of the processing of method 200 in which the distribution of fully assessed model outcomes is estimated using a stage 250b. In stage 250b, the dataset is processed in stages 610, 620, 640, 650, and 660 analogously to the manner in which the dataset is processed in stages 310, 320, 340, 350, and 360 in FIG. 3. The selecting and performing steps are repeated in stage 250b until the cumulative model outcome distribution reaches a predetermined level of convergence, at which point the cumulative model outcome distribution is selected as the estimated model distribution and stage 250b ends with a stage 680.

In a stage 670, the cumulative model outcome distribution is tested to determine if it has converged relative to previous cumulative model outcome distributions. The cumulative model outcomes may be said to have converged when they are within a pre-determined value distance from corresponding cumulative model outcomes obtained in a selected number of last previous repetitions of the selecting and performing steps. While the selected number of repetitions may be any desired number, in one embodiment, it is three repetitions. Therefore, when the cumulative model outcome distribution are found to be within a pre-determined acceptable tolerance limit three repetitions in a row, the cumulative model outcome distribution is determined to have converged.

It may be seen that the number (x) of classes, the sample size (z), and the number (y) of tests are interrelated values. For example, if the number of classes increases, the sample size could be smaller. If the sample size decreases, the number of tests required to obtain convergence of the results may increase. Increasing the sample points chosen per class may decrease the number of replications needed for convergence. Keeping the number of replications fixed could achieve the same convergence result with more classes and/or more sample data points per class.

In addition, when one of the model inputs is held constant, the other variables of the modeling analysis may be altered to provide for different types of analyses.

Figure 7:
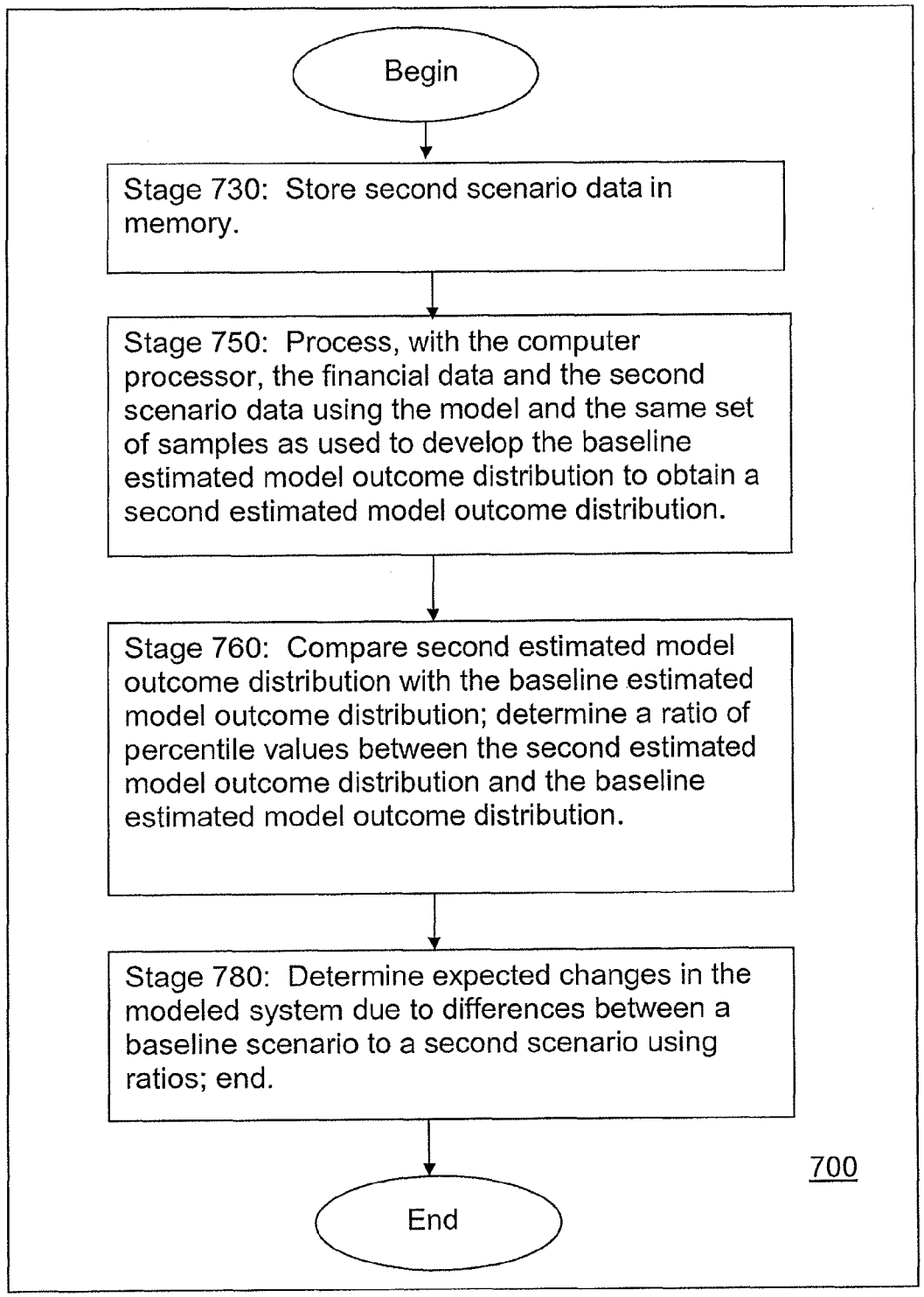
FIG. 7 is a flowchart depicting a method for use in a management tool for determining expected changes in a modeled system due to differences between a baseline scenario and a second scenario.

FIG. 7 illustrates a method for analyzing different "what-if" scenarios by developing baseline estimated model outcomes as a point of reference and comparing them to estimated model outcomes developed from a second set of scenarios using the same set of samples. In this embodiment, the set of scenarios of method 200 may comprise a baseline set of scenarios, the estimated model outcomes may comprise baseline estimated model outcomes, and the estimated model outcome distribution may comprise a baseline estimated model outcome distribution. In a method 700, second scenario data for a second set of scenarios may be stored in a stage 730 in the computer readable memory, and in a stage 750 the financial data and the second scenario data may be processed using the model to obtain a second estimated model outcome distribution associated with the second set of scenarios. In one embodiment the same set of samples that were used to develop the baseline are used to develop the second estimated model outcome distributions. In a stage 760, the baseline estimated model outcomes developed in stage 250 may then be compared with the second estimated model outcomes in order to identify differences therebetween. In a further aspect, a ratio of percentile values between the second estimated model outcome distribution and the baseline estimated model outcome distribution is determined. In another embodiment, the ratio of the key percentile values between the second set of scenarios and the baseline set of scenarios is measured in order to develop an estimate of the change in the outcomes under the baseline set of scenarios.

Holding the samples constant allows for the ratios between the distributions to be consistent. Even with an unrepresentative sample, in which the baseline and second model outcomes will not accurately estimate the fully assessed model outcome, the differences between the baseline and second model outcomes will accurately reflect the differences in outcome caused by the differences between the second set of scenarios and the baseline set of scenarios.

As an example of the systems and methods described herein, as applied to insurance risk analysis, a variable annuity product with a Guaranteed Minimum Death Benefit (GMDB) that has a choice of four funds may be analyzed to determine the impact of a 50% decrease in fund values with no change in fund volatility. Models of the product for 1000 policies and 5000 policies may be developed in Microsoft Excel™ software, and 1000 stochastic scenarios may be developed. An analysis of the dataset may show that it has the following characteristics: all policyholders have attained age 45; males/females are equally distributed; and smokers/non-smokers are equally distributed. Four key risk classes ($x=4$) may be identified in the dataset: Male/Non-Smoker, Female/Non-Smoker, Male/Smoker, and Female/Smoker.

Using a stratified sample of one policy from each of four defined risk classes (i.e. sample of four policies or $z=4$), it may take an average of four hundred replications ($y \approx 400$) to produce an estimated model outcome distribution comparable to a fully assessed model distribution obtained by modeling the entire dataset (with less than a 1% sampling error). In addition, obtaining an estimated model outcome distribution may take fewer than five minutes while the fully assessed approach, modeling the entire dataset of 5000 policies, may take two hours.

Further, the sample size (x) and number of replications needed for convergence may appear to be independent of the dataset size, but more dependent on the number of key risk classes identified. In order to minimize processing time, it appears that a sample size of one policy from each risk class provides the optimal mix of sample size versus number of replications.

One of ordinary skill in the art will appreciate that the methods described herein may be embodied with various components of a computer system. It is understood that both the foregoing general description and the following detailed description are exemplary and explanatory only, and are not restrictive of the invention as claimed.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the invention is not limited to financial or actuarial data analysis. The data system 100 described above the system 100 is useful for performing stochastic modeling using any large dataset and especially for producing predictive or probabilistic outcomes from stochastic models operating on large datasets. The data system 100 is useful for real-time stochastic modeling analyses of any large dataset. In addition, the system 100 is useful for performing data analyses of complex models (models having a large number of variables), such as econometric analysis. The system 100 is also useful for producing projective outcomes such as creating financial projections of assets or deposits, or for projecting costs for individual or group need, such as healthcare, housing, or education.

In addition, the described implementations may be implemented in software, hardware, or a combination of hardware and software. Examples of hardware include computing or processing systems, such as personal computers, servers, laptops, mainframes, and micro-processors. The software modules 110 may include inter-linked sampler module 112, modeler module 114, and repetition module 116. The sampler module 112 may be configured to select a first subset of the financial data as a first sample of the financial data. The sampler module may be further configured to draw the additional subsets with replacement from the population and without replacement from each of the class segments after prior samples are returned to the population. and the modeler module 114 may be configured to perform, with the model and the samples, tests of the scenarios to obtain sample outcomes for each of the scenarios. The repetition module 116 may be configured to repeat the subset selection and the test performance using additional subsets of the financial data to perform additional tests and to obtain additional sets of sample outcomes for each of the scenarios.

The methods disclosed herein are especially useful in computer systems used in analyzing many kinds of data. For example, the software modules 110 containing instructions for executing the methods disclosed here may be linked to or incorporated into proprietary or third party actuarial analysis software such as the VIPitech™ actuarial analysis software available from Watson Wyatt Worldwide of Arlington, Va. However, one of ordinary skill in the art will appreciate that the features and principles disclosed herein may be implemented in various computer systems. One of ordinary skill in the art will also appreciate that features and principles disclosed herein may be implemented in different components of a computer. Although the disclosed modules have been described above as being separate modules, one of ordinary skill in the art will recognize that functionalities provided by one or more modules may be combined. As one of ordinary skill in the art will appreciate, one or more modules may be optional and may be omitted from implementations in certain embodiments. Similarly, one of ordinary skill in the art will also appreciate that computer readable program code to implement a method consistent with features and principles disclosed herein may be stored on various media, including various persistent memory devices.

The embodiments and aspects of the features and principles set forth above are only exemplary and explanatory. They are not restrictive of the invention as claimed and do not limit the invention to the precise forms or embodiments disclosed. Other embodiments consistent with features and principles set forth above are included in the scope of the present invention. As the following sample claims reflect, inventive aspects may lie in fewer than all features of a single foregoing disclosed embodiment. Thus, the following claims are hereby incorporated into this description, with each claim standing on its own as a separate embodiment of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for performing analysis of financial data, comprising the steps of:
    storing, in a computer readable memory,
        financial data related to a population of financial data records and segmented into a number (x) of classes, wherein the class segments are mutually exclusive and collectively exhaustive of the financial data, and
        scenario data for a set of scenarios, wherein each of the scenarios is defined at least in part by a set of variables, and wherein the scenario data for each of the scenarios comprise at least some parameter values for the set of variables;
    providing a computer processor associated with the computer readable memory with a model of a system defined at least in part by the set of variables; and
    processing, with the computer processor, the financial data and the scenario data using the model to obtain an estimated model outcome distribution comprising a distribution of estimated model outcomes relating to the system and based on the set of scenarios, the processing further comprising:
        selecting a first subset of the financial data as a first sample, the first subset drawn without replacement from each of the class segments of the population and having a sample size (z);
        performing, with the model and the first subset, a first test of the set of scenarios to obtain a first set of sample outcomes for each of the scenarios; and
        repeating the selecting and performing steps using additional subsets of the financial data to perform additional tests of the set of scenarios and to obtain additional sets of sample outcomes for each of the scenarios;
            wherein the additional subsets are drawn without replacement from each of the class segments;
            wherein the first sample outcomes and the additional sample outcomes are combined to create a cumulative estimated model outcome distribution;
            wherein the selecting and performing steps are repeated until the cumulative model outcome distribution is within a pre-determined acceptable tolerance limit from a distribution of fully assessed model outcomes for the set of scenarios obtainable by performing, with the model, a single test of the set of scenarios using all of the data; and
            wherein the cumulative model outcome distribution is identified as the estimated model outcome distribution;
        wherein the number (x) of classes, the sample size (z), and a number (y) of tests comprising a count of the number of times that the performing step is conducted ensure that the cumulative model outcome distribution is within the pre-determined acceptable tolerance limit from the distribution of fully assessed model outcomes.

2. The computer-implemented method of claim 1, further comprising using stratified sampling techniques to generate the samples.

3. The computer-implemented method of claim 1, wherein selecting the first sample and the additional samples comprises selecting, from a selected class segment, a number of records that is proportional to a count of records in the selected class segment relative to a total count of records in the financial data.

4. The computer-implemented method of claim 1, wherein the additional subsets are drawn with replacement from the population and without replacement from each of the class segments after prior samples are returned to the population.

5. The computer-implemented method of claim 1, wherein the additional subsets have the sample size (z).

6. The computer-implemented method of claim 1, further comprising segmenting the financial data into the selected number (x) of classes before storing the financial data in the computer readable memory.

7. The computer-implemented method of claim 1,
    wherein the financial data comprises insurance policyholder data;
    wherein the model comprises a model of insurance liability; and
    wherein the model outcomes comprise measures of a risk comprising a likelihood of an occurrence of the insurance liability for a scenario in the set of scenarios.

8. The computer-implemented method of claim 1, further comprising
    randomly sampling the financial data from each of the class segments to create a pseudo-population of records;
        wherein processing the financial data and the scenario data further comprises treating the pseudo-population as the population for the selecting step and the performing step to obtain pseudo-population outcomes for each of the scenarios; and
        wherein the combining step further comprises combining the pseudo-population outcomes to obtain a distribution of cumulative model outcomes for the pseudo-population.

9. The computer-implemented method of claim 8, further comprising repeating the selecting and performing steps using the number (x) of classes, the sample size (z), and the number (y) of tests to estimate the fully assessed model outcomes for the entire population.

10. The computer-implemented process of claim 8, wherein each of the pseudo-population outcomes comprises a value; further comprising
    adjusting each of the pseudo-population outcomes relative to the population so that a value of a selected pseudo-population outcome associated with a selected scenario comprises a preliminary estimate of a value of a fully assessed model outcome associated with the selected scenario and obtainable by performing, with the model, the single simulation of the scenario using the population of records.

11. The computer-implemented method of claim 1, wherein combining the sample outcome distributions further comprises averaging sample outcomes associated with each of the scenarios for each of the tests to obtain an average estimated model outcome for each of the scenarios.

12. The computer-implemented method of claim 1, further comprising ordering the estimated model outcomes to obtain percentiles in the estimated model outcomes distribution.

13. The computer-implemented method of claim 1,
    wherein each of the sample outcomes comprises a value; and
    wherein combining the sample outcomes further comprises adjusting each of the sample outcomes relative to an entire dataset of the financial data so that the value of a selected sample outcome associated with a selected scenario comprises a preliminary estimate of the value of a fully assessed model outcome associated with the selected scenario and obtainable by performing, with the model, a single simulation of the scenario using the entire dataset.

14. The computer-implemented method of claim 1,
wherein the set of scenarios comprises a baseline set of scenarios, the estimated model outcomes comprise a baseline estimated model outcomes, and the estimated model outcome distribution comprises a baseline estimated model outcome distribution; and
wherein the method further comprises:
- storing, in the computer readable memory, second scenario data for a second set of scenarios;
- performing the processing step with the financial data and the second scenario data using the model to obtain a second estimated model outcome distribution associated with the second set of scenarios; and
- comparing the baseline estimated model outcomes with the second estimated model outcomes in order to identify differences therebetween.

15. The computer-implemented method of claim 14, wherein the comparing step comprises determining a ratio of percentile values between the second estimated model outcome distribution and the baseline estimated model outcome distribution.

16. The computer-implemented method of claim 14, wherein the second estimated model outcome distribution is developed using the same set of samples used to develop the baseline estimated model outcome distribution.

17. The computer-implemented method of claim 1, further comprising selecting the number (y) of tests and the sample size (z), by:
- performing the processing step with a plurality of combinations of the sample size and the number of tests to identify an optimal combination of the sample size and the number of tests at which is obtained an optimal speed of convergence of the cumulative model outcome distribution over repetitions of the selecting and performing steps; and
- selecting the optimal combination as the number (y) of tests and the sample size (z).

18. The computer-implemented method of claim 17, further comprising:
- selecting the sample size (z) and a plurality of number of tests;
- performing the processing step with the plurality of number of tests to identify an optimal number of tests required to obtain the optimal speed of convergence; and
- selecting the optimal number of tests and the sample size (z) as the optimal combination.

19. The computer-implemented method of claim 17, further comprising selecting the number (y) of tests and a plurality of sample sizes;
- performing the processing step with the plurality of sample sizes to identify an optimal sample size required to obtain the optimal speed of convergence; and
- selecting the optimal sample size and the number of tests (y) as the optimal combination.

20. The computer-implemented method of claim 1, wherein the samples are representative of the classes in the financial data.

* * * * *

UNITED STATES PATENT AND TRADEMARK OFFICE
CERTIFICATE OF CORRECTION

PATENT NO. : 8,126,747 B2
APPLICATION NO. : 13/009914
DATED : February 28, 2012
INVENTOR(S) : Jeyaraj Vadiveloo It is certified that error appears in the above-identified patent and that said Letters Patent is hereby corrected as shown below:

Claim 14, col. 19, lines 3-4, "comprise a baseline estimated model outcomes" should read --comprise baseline estimated model outcomes--.

Signed and Sealed this
Twenty-second Day of May, 2012

David J. Kappos
*Director of the United States Patent and Trademark Office*